US008847770B2

(12) United States Patent
Miller et al.

(10) Patent No.: US 8,847,770 B2
(45) Date of Patent: Sep. 30, 2014

(54) SYSTEM AND METHOD FOR ALCOHOL MONITOR BASED ON DRIVER STATUS

(75) Inventors: Thomas Lee Miller, Ann Arbor, MI (US); Brian Bennie, Sterling Heights, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 559 days.

(21) Appl. No.: 12/536,265

(22) Filed: Aug. 5, 2009

(65) Prior Publication Data

US 2011/0032096 A1    Feb. 10, 2011

(51) Int. Cl.
  G08B 23/00    (2006.01)
  B60K 28/06    (2006.01)
  G08B 29/00    (2006.01)
  G08B 19/00    (2006.01)
  B60R 25/10    (2013.01)
  G08B 1/08     (2006.01)
  B60K 28/00    (2006.01)
  G01M 17/00    (2006.01)
  B60R 22/00    (2006.01)

(52) U.S. Cl.
  CPC .......... B60K 28/063 (2013.01); *B60W 2540/28* (2013.01); *B60W 2540/24* (2013.01)
  USPC .......... 340/576; 340/5.6; 340/5.61; 340/5.72; 340/5.21; 340/5.22; 340/5.23; 340/426.11; 340/438; 340/539.1; 180/272; 701/31.4; 701/45

(58) Field of Classification Search
  USPC ................. 340/539.1, 5.6; 180/272; 701/45
  See application file for complete search history.

(56) References Cited

U.S. PATENT DOCUMENTS

| 6,225,890 | B1* | 5/2001 | Murphy ................ 340/426.19 |
| 6,659,360 | B1* | 12/2003 | Schaefer et al. ................ 236/51 |
| 6,853,956 | B2 | 2/2005 | Ballard, Jr. et al. |
| 7,075,409 | B2 | 7/2006 | Guba |
| 7,256,700 | B1* | 8/2007 | Ruocco et al. ................ 340/576 |
| 7,391,305 | B2* | 6/2008 | Knoll et al. .................... 340/438 |
| 2002/0084130 | A1 | 7/2002 | Der Ghazarian et al. |
| 2004/0239510 | A1* | 12/2004 | Karsten .......................... 340/576 |
| 2004/0263316 | A1* | 12/2004 | Dix et al. ...................... 340/5.23 |
| 2006/0036358 | A1* | 2/2006 | Hale et al. ........................ 701/45 |
| 2006/0082434 | A1* | 4/2006 | Brey .............................. 340/5.6 |
| 2006/0180378 | A1 | 8/2006 | Nordin |
| 2007/0144812 | A1* | 6/2007 | Stewart et al. ................ 180/272 |

(Continued)

OTHER PUBLICATIONS

Joshua, Topolsky, "Nissan begins testing drunk proof car", 6 pages, posted Jul. 23, 2007.
Sam Abuelsamid, Geneva Motor Show: Saab BioPower 100 Concept—AutoblogGreen, Mar. 6, 2007, 15 pages.
Volvo Cars launches new Alcoguard, The Volvo Owners Club, 3 pages, Volvo Press Releases 2008.

*Primary Examiner* — Jack K Wang
(74) *Attorney, Agent, or Firm* — Brooks Kushman P.C.; Jennifer M. Stec

(57) ABSTRACT

In at least one embodiment, an apparatus for performing an alcohol monitor in a vehicle based on a driver being one of a primary driver and a secondary driver is provided. The apparatus comprises an electronic device that is positioned within the vehicle. The electronic device is configured to receive a driver status signal indicating that the driver of the vehicle is the secondary driver. The electronic device is further configured to receive an alcohol content measurement from an alcohol monitoring device (AMD) indicative of blood alcohol content for the secondary driver. The electronic device is further configured to compare the alcohol content measurement to a predetermined alcohol content.

19 Claims, 3 Drawing Sheets

(56) References Cited

U.S. PATENT DOCUMENTS

| | | |
|---|---|---|
| 2007/0266766 A1 | 11/2007 | Schlichte |
| 2008/0030316 A1* | 2/2008 | Flick .............................. 340/466 |
| 2008/0275604 A1 | 11/2008 | Perry et al. |
| 2008/0319602 A1* | 12/2008 | McClellan et al. ............. 701/33 |
| 2009/0076700 A1* | 3/2009 | Radpour ......................... 701/93 |
| 2009/0293589 A1* | 12/2009 | Freund et al. .................. 73/23.3 |
| 2010/0042303 A1* | 2/2010 | Fiske et al. ...................... 701/70 |
| 2010/0294583 A1* | 11/2010 | Biondo et al. ................ 180/272 |

* cited by examiner

SYSTEM AND METHOD FOR ALCOHOL MONITOR BASED ON DRIVER STATUS

BACKGROUND

1. Technical Field

The embodiments of the present invention disclosed herein generally relate to a system and method for alcohol monitor based on driver status.

2. Background Art

With conventional automotive vehicles, one or more keys are often shared between any number of drivers (e.g., parent/teen, employer/employee, owner/valet driver, or fleet vehicle owner/fleet vehicle driver). In one example, the parents of a teenager (or young adult) that is old enough to drive may provide the keys of the vehicle to the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other primary drivers, the option of preventing teenagers that are eligible to drive or other such secondary drivers from disabling safety and notification features.

Alcohol usage and subsequent operation of a vehicle is recognized as a risky behavior and poses serious safety concerns not only for the driver and other occupants in the vehicle, but for the public as a whole. Vehicle fatalities for teens that operate a vehicle while under the influence of alcohol are alarming. For example, vehicle fatalities for 16 year old drivers that had a blood alcohol level greater than 0.08% were that of roughly 13%. Vehicle fatalities for drivers between the age group of 17 to 19 years of age increase to 25%. It is also recognized that alcohol consumption is known to exist for employees who operate vehicles owned by various employers.

SUMMARY

In at least one embodiment, an apparatus for performing an alcohol monitor in a vehicle based on a driver being one of a primary driver and a secondary driver is provided. The apparatus comprises an electronic device that is positioned within the vehicle. The electronic device is configured to receive a driver status signal indicating that the driver of the vehicle is the secondary driver. The electronic device is further configured to receive an alcohol content measurement from an alcohol monitoring device (AMD) indicative of blood alcohol content for the secondary driver. The electronic device is further configured to compare the alcohol content measurement to a predetermined alcohol content.

DETAILED DESCRIPTION

The embodiments of the present invention generally identifies the driver of the vehicle whereby primary and secondary drivers are determined and various levels of control are granted to the driver based on whether the driver is the primary driver or the secondary driver. In general, the primary driver (e.g., a parent, employer, consumer of valet services, fleet vehicle owner) may be defined as the administrative driver who has greater control over the functionality of the various features (e.g., safety features and/or safety notification features) in the vehicle. For example, the primary driver may enable or disable the various features in the vehicle. The secondary driver may be defined as a restricted driver who has limited control in enabling and disabling features generally provided by the vehicle and is to abide by the functional restrictions imposed or selected by the vehicle or the primary driver. For example, the primary driver may enable the features for the secondary driver, and the secondary driver is not capable of disabling such features when enabled by the primary driver.

The embodiments of the present invention generally provide, among other things, a system and method for alcohol monitor based on driver status. For example, electrical device(s) in the vehicle may determine driver status (e.g., whether the driver is the primary driver or the secondary driver) and require that the secondary driver perform an alcohol monitor. The electrical device(s) may, among other things, prevent the secondary driver from driving the vehicle, limit vehicle speed, and/or disable an infotainment system in the event the measured blood alcohol level is greater than a predetermined alcohol level.

Figure 1:
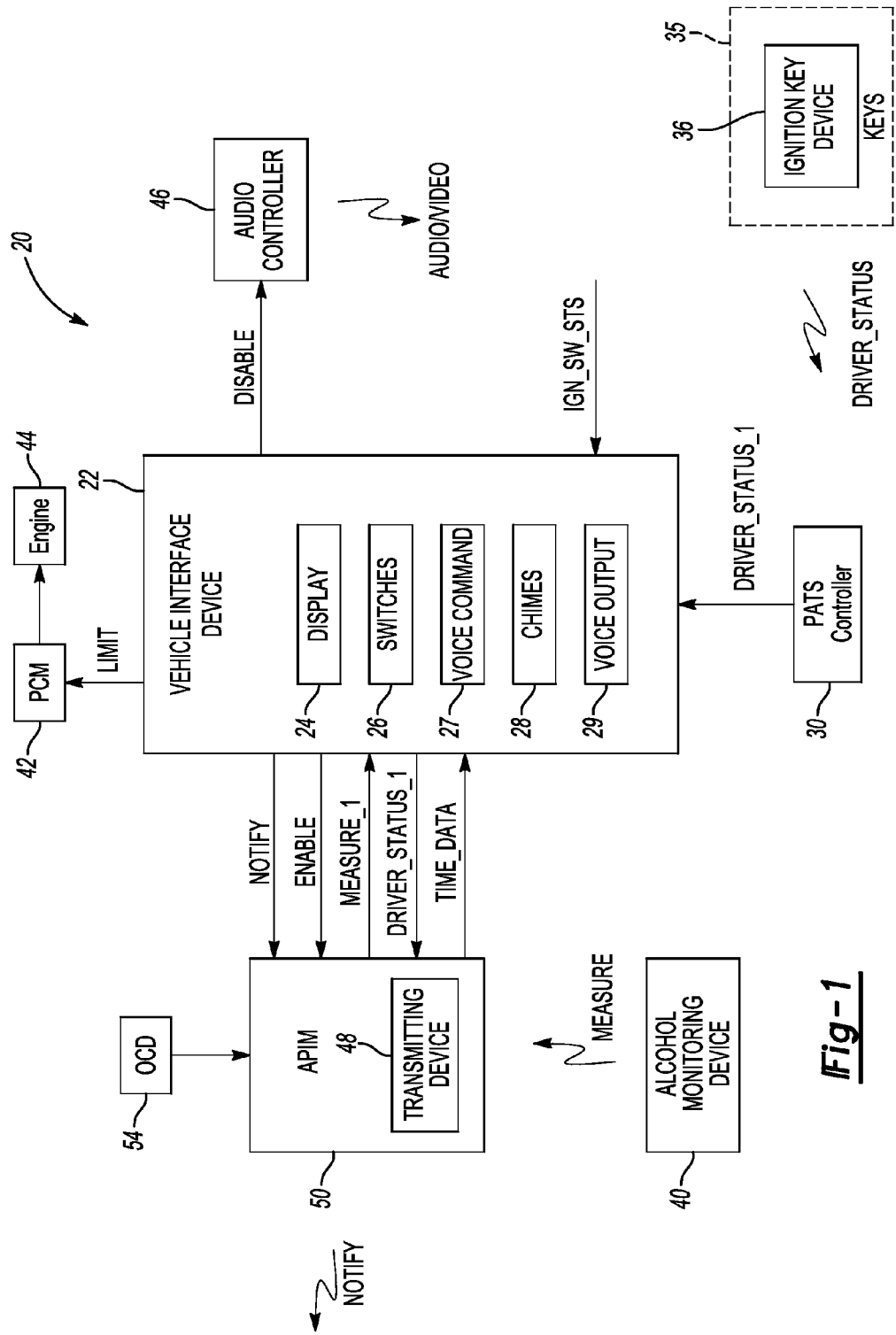
FIG. 1 depicts a system for differentiating between primary and secondary drivers of a vehicle and for monitoring a blood alcohol level for a driver based on driver status in accordance to one embodiment of the present invention.
Figure 2:
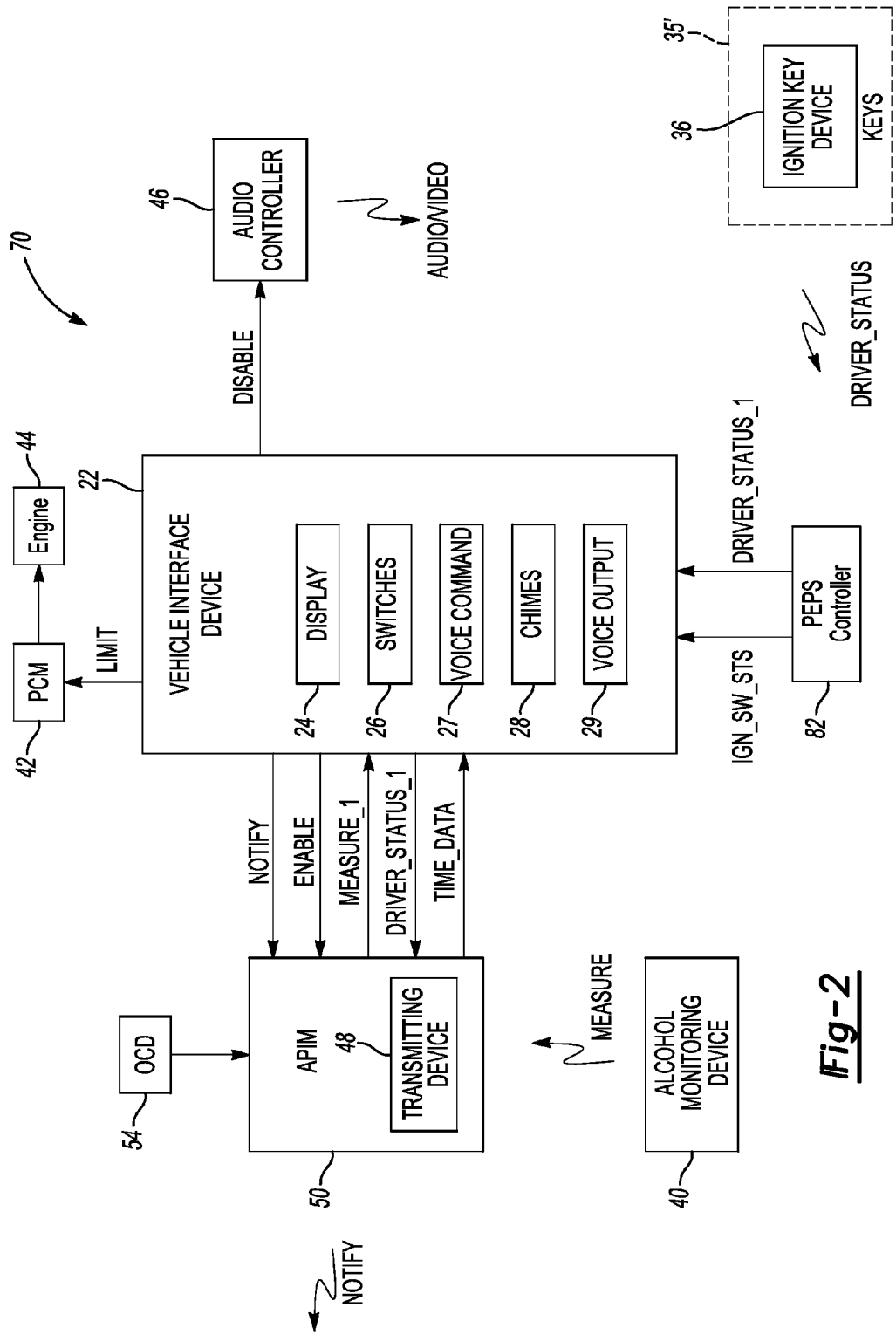
FIG. 2 depicts a system for differentiating between primary and secondary drivers of a vehicle and for monitoring a blood alcohol level for a driver based on driver status in accordance to one embodiment of the present invention.
Figure 3:
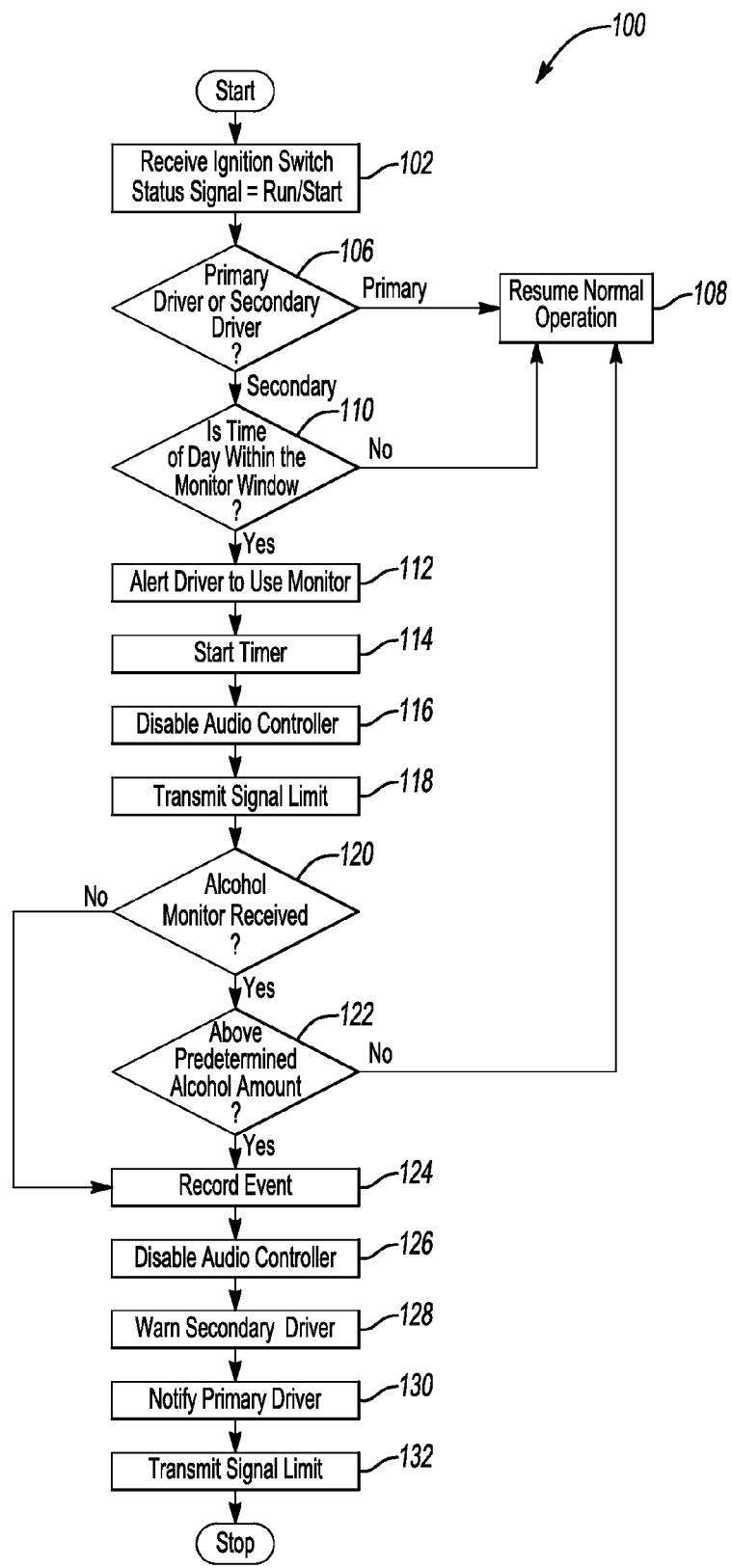
FIG. 3 depicts a method for monitoring alcohol based on driver status and for controlling vehicle operations in accordance to one embodiment of the present invention.

The embodiments of the present invention as set forth in FIGS. 1-3 generally illustrate and describe a plurality of controllers (or modules/devices), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired in the vehicle. It is generally recognized that each controller and/or module/device disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

FIG. 1 depicts a system 20 for differentiating between primary and secondary drivers of a vehicle and for monitoring a blood alcohol level for a driver based on driver status in accordance to one embodiment of the present invention. In general, the system 20 is configured to provide an alcohol monitor for a particular driver and to control the operation of the vehicle based on the blood alcohol content of the driver. The system 20 may perform the aforementioned operation(s) in the event the driver is the secondary driver. It is contemplated that the system 20 may perform the aforementioned operation(s) irrespective of the status of the driver.

The system 20 generally comprises a vehicle interface device 22. The device 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message.

The device 22 also includes a plurality of switches 26, a voice recognition command interface 27, chimes 28, and voice output capability 29. The driver may toggle the switches 26 to view different messages and/or select various options. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, and/or when the traction control is enabled. In one example, the voice output capability 29 enables the device 22 to transmit audio signals to the driver in the manner, but not limited to, that described in the '440 publication. While the display 24, the switches 26, the voice input command interface 27, chimes 28, and the voice output capability 29 are shown within the device 22, it is contemplated that one or more of these mechanisms may be positioned exterior to the device 22.

A passive anti-theft security (PATS) controller 30 is operably coupled to the device 22. While FIG. 1 illustrates that the PATS controller 30 is positioned outside of the device 22, other implementations may include the PATS controller 30 being implemented directly within the device 22. In general, one or more of the signals transmitted to/from the device 22 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 35. The device 22 may receive a signal IGN_SW_STS from a body controller (not shown) to determine the position of the ignition switch. The keys 35 may be tagged or associated with the primary driver or the secondary driver of the vehicle. The key 35 includes an ignition key device 36 embedded therein for communicating with the vehicle. The ignition key device 36 may be in the form of a transponder (not shown) that includes an integrated circuit and an antenna. The transponder is adapted to transmit an electronic code as a signal DRIVER_STATUS to a receiver (not shown) in the PATS controller 30. The signal DRIVER_STATUS may be indicative of which driver (e.g., primary or secondary) is driving the vehicle. The signal DRIVER_STATUS may be in the form of a radio frequency (RF) based signal or a radio frequency identification (RFID) tag that corresponds to binary data. The PATS controller 30 determines if the RF based data in the signal DRIVER_STATUS matches predetermined data stored therein (e.g., in a look up table of the PATS controller 30) prior to allowing the vehicle to start for anti-theft purposes. In the event the RF based data matches the predetermined data, a powertrain control module (PCM) 42 (or engine controller) operably coupled to the PATS controller 30 enables an engine 44 to start. In general, the vehicle assembly plant, supplier facility (e.g., manufacturer of the keys and/or PATS controller 30), car dealership, or vehicle owner performs the operation of learning the data transmitted by the keys 35. The PATS controller 30 may also use the data on the signal DRIVER_STATUS for purposes of identifying whether the driver of the vehicle is the primary driver or the secondary driver.

The PATS controller 30 may transmit a signal DRIVER_STATUS_1 to indicate whether the driver is the primary driver or the secondary driver. Prior to the PATS controller 30 transmitting the signal DRIVER_STATUS_1, the keys 35 need to be programmed as a primary key or as a secondary key. The manner in which the keys 35 are designated as either a primary key or a secondary key is set forth in one or more of the following U.S. patent Ser. No. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and PCT/US2009/048261 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Jun. 23, 2009, all of which are hereby incorporated by reference in their entirety.

An auxiliary protocol interface module (APIM) (or communication module) 50 is operably coupled to the device 22. The APIM 50 is configured to receive an occupant communication device (OCD) 54. The APIM 50 is generally part of an in-vehicle communication system which interfaces with the OCD 54 to enable voice input control to perform a function with the OCD 54 so that the driver does not have to enter data directly into the OCD 54. The APIM 50 may interface via switches (not shown) positioned within the vehicle to enable touch selection control to perform a function with the OCD 54 so that the driver does not have to enter data directly into the OCD 54. The OCD 54 is wirelessly coupled to the APIM 50. In one example, the APIM 50 may be implemented as part of the SYNC system developed by Ford Motor Company® and Microsoft®. The OCD 54 may include any number of communication devices that use a wireless protocol. For example, one such wireless protocol may include Bluetooth™. The OCD 54 may use any protocol that is generally situated to facilitate wireless communication. The OCD 54 may be a phone, a text messaging device, a music generating device (such as a phone that plays MP3 songs) whereby all of such items use the Bluetooth™ protocol to communicate. In yet another example, the OCD 54 may include other devices such as Universal Serial Bus (USB) based music playback devices (e.g., Zune™ and iPod® by Apple®). In yet another example, the OCD 54 may include a link that is hardwired coupled into a line-in input provided on the APIM 50. Such a link may receive an input from music playback device to transmit audio via speakers in the vehicle.

In general, the APIM 50 may receive any mobile communication device or digital media player and allow the vehicle occupant to operate such devices via voice input and/or touch input. Switches may be positioned on the APIM 50, the vehicle's steering wheel (not shown), an audio controller 70, or on the device 22 to enable touch input. In the event the OCD 54 comprises a wireless protocol based text messaging device that is coupled to the APIM 50, the vehicle occupant may be presented with a listing of preselected text messages from the APIM 50 for the occupant to select via touch input and/or voice input to transmit the selected text to another user.

An alcohol monitoring device (AMD) 40 is operably coupled to the APIM 50 (or other suitable device in the vehicle). The primary driver may install the AMD 40 in the vehicle. The AMD 40 is configured to provide a value that corresponds to the blood alcohol level for a particular driver. In one example, the AMD 40 may include fuel cell based technology that detects ethanol molecules as such molecules pass through a membrane positioned within the AMD 40. The measured ethanol may be indicative of the blood-alcohol limit for the driver who breathes into the AMD 40. It is known to use fuel cell based technology to measure blood alcohol content for a driver. It is contemplated that the AMD 40 may also include, but not limited to, Taguchi cells, infrared spectroscopy, gas chromatography implementations and/or other suitable devices for the purpose of providing the blood alcohol level for a driver. In one embodiment, the AMD 40 may be implemented as a remote based device that is configured to wirelessly transmit a signal MEASURE that includes information related to the measured blood alcohol content. The APIM 50 and the AMD 40 may communicate with each other via Bluetooth™ protocol or other suitable communication link. The AMD 40 may be any aftermarket alcohol measuring device that is generally configured to interface with devices in the vehicle. The APIM 50 may use the Bluetooth™ protocol to determine the presence of the AMD 40 in the vehicle. It is contemplated that the AMD 40 may be hardwired coupled to the APIM 50 in the event the AMD 40 is implemented as a device that requires a hardwired link to communicate with the APIM 50. The particular implementation with respect to whether the AMD 40 is hardwired linked or wirelessly linked may vary based on the desired criteria of a particular implementation.

The APIM 50 may transmit a signal MEASURE_1 to the device 22. The signal MEASURE_1 may include the information related to the blood alcohol content of the driver. The primary driver may use one or more of the user interfaces (display 24, switches 26, and/or voice command 27) to enable the alcohol monitor feature for secondary driver. For example, in the event the primary driver has enabled the alcohol monitor feature for the secondary driver, the secondary driver is required to provide a measurement of his/her blood alcohol content via the AMD 40 prior to, or subsequent to starting the vehicle. The vehicle may, among other things, prevent the vehicle from starting or limit the speed/acceleration of the vehicle based on the alcohol content of the secondary driver. If the primary driver has enabled the alcohol monitor feature for the secondary driver the device 22 may transmit a signal ENABLE to the APIM 50 so that the APIM 50 transmits the signal MEASURE_1 to the device 22. The APIM 50 may transmit a signal TIME_DATA indicating that time of day. The APIM 50 receives the time data from the OCD 54 and/or a transmitting device 48. The transmitting device 48 will be discussed in more detail below.

The device 22 may receive data indicative of the blood alcohol content level for the secondary driver over the signal MEASURE_1 and compare such data to predetermined alcohol content. If the blood alcohol content is greater than the predetermined alcohol content, then the device 22 may transmit a signal LIMIT to a powertrain control module (PCM) 42. Generally, the PCM 42 and the engine 44 co-act with one another to drive the vehicle at a speed desired by the driver. In one example, the signal LIMIT may correspond to a command that instructs the PCM 42 to prevent the engine 44 from generating speed (e.g., vehicle not capable of being driven). In another example, the signal LIMIT may include data corresponding to a maximum speed limit that can be attained (e.g., 15 mph or other suitable value) to allow the vehicle to be placed in a "limp home mode" so that the vehicle is capable of driving to a desired location at a substantially reduced speed.

An audio controller 46 is operably coupled to the device 22. The audio controller 46 is configured to transmit audio and/or video signals to occupants in the vehicle for entertainment purposes. The device 22 may transmit a signal DISABLE to the audio controller 46 so that the controller 46 disables the transmission of the audio and/or video signals in response to the signal DISABLE. The device 22 may transmit the signal DISABLE to the controller 46 in the event the secondary driver refuses to use the AMD 40 within a predetermined amount of time and/or in the event the blood alcohol reading for the secondary driver exceeds the predetermined alcohol content.

The system 20 may (i) generate a warning to the driver about the dangers of driving while under the influence of consuming alcohol (via the display 24 and/or voice output 29), (ii) wirelessly transmit a message to a communication device belonging to the primary driver via a transmitting device 48 within the APIM 50 to notify the primary driver (or wirelessly transmit the message via the OCD 54 belonging to the secondary driver); (iii) limit the vehicle speed/acceleration or prevent the vehicle from being driving, and/or (iv) store the time and occurrence of the event within the device 22 in a report for transmission to the primary driver in the event the secondary driver refuses to use the AMD 40 within the predetermined amount of time.

In the event the secondary driver uses the AMD 40 within the predetermined amount of time and the measured blood alcohol content is above the predetermined alcohol amount, the system 20 may perform one or more of the operations noted directly above. In the event the secondary driver uses the AMD 40 within the predetermined amount of time and the measured blood alcohol content is below the predetermined alcohol amount, the system 20 may (i) store such information in the report for submission to the primary driver and (ii) enable normal operation of the vehicle for the secondary driver.

The device 22 may require that the secondary driver use the AMD 40 during a time window that is established by the primary driver via the user interfaces (24, 26, and/or 27). For example, it is recognized that alcohol consumption is prone to occur for teens during evening hours. Likewise, for employees, alcohol consumption is more adept to occur during lunchtime. To accommodate for the time in which alcohol consumption and driving may occur, the primary driver may setup an alcohol monitor time window (e.g., 7 pm-4 am on weekends for teens or other persons or between 11 am-2 pm on weekdays for employees) via the user interfaces (24, 26, and/or 27) on the device 22 so that the secondary drivers are required to use the AMD 40 within the established time window. It may not be practical to require that the secondary driver use the AMD 40 at all times particularly in moments throughout the day in which alcohol is not likely to be consumed. To require that the secondary drivers engage in using the AMD 40 at all times may be cumbersome and time consuming. The device 22 may receive time/date information from the transmitting device 48 and/or the OCD 54 as it is contemplated that such devices are capable of providing the current time and date to the device 22.

FIG. 2 depicts another system 70 for differentiating between primary and secondary drivers of a vehicle and for monitoring alcohol consumption based on driver status in accordance to one embodiment of the present invention. The system 70 implements a passive entry passive start function to gain entry into and to start the vehicle as opposed to the PATS system that is used for the system 20 for starting the vehicle. A passive entry passive start (PEPS) controller 82 may be operably coupled to the device 22. While FIG. 2 generally illustrates that the PEPS controller 82 is positioned external to the device 22, additional implementations may include positioning the PEPS controller 82 within the device 22. The particular placement of the PEPS controller 82 with respect to the device 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the electronic code as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle (not shown) of the vehicle. In response to the door handle being toggled or touched, the PEPS controller 82 may wake up and transmit RF based signals to the keys 35'. The PEPS controller 82 and the keys 35' may undergo a series of communications back and forth with each other (e.g., handshaking) for vehicle access authentication purposes. The PEPS controller 82 may unlock the doors in response to a successful completion of the handshaking process. Once the driver is in the vehicle, the driver may simply press a button (not shown) positioned on an instrument panel to start the vehicle.

In one example, the system 70 may be adapted to tag or associate the keys as either a primary or a secondary key during a learn operation as discussed with the PATS controller 30. In yet another example, the system 70 may be configured to associate the keys 35' as primary or secondary keys in the manner identified and disclosed in one or more of the following U.S. patent Ser. No. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and PCT/US2009/048261 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Jun. 23, 2009. The PEPS controller 82 may determine the driver status based on the information indicated on the signal DRIVER_STATUS as noted in connection with the system 20 of FIG. 1.

The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the device 22. The PEPS controller 82 determines that the key ignition status is in the run position in response to the driver toggling the brake pedal (not shown) and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' that are used in connection with the PATS and PEPS implementations, respectively, it is generally contemplated that the keys may be implemented as a cell phone or other suitable switch device used to authenticate the driver to the vehicle for enabling entry into the vehicle or for starting the vehicle. Data transmitted from the cell phone may be received by a receiver (not shown) on the vehicle and decoded to perform driver authentication for gaining entry into the vehicle, starting the vehicle, and ascertaining driver status.

The system 70 operates in a similar manner to the system 20 with respect to measuring and monitoring alcohol content for the secondary driver. The system 70 also operates in a similar to the system 20 with respect to controlling various vehicle features as disclosed above in connection with system 20 based on the whether the secondary driver uses the AMD 40 within the predetermined amount of time and/or based on the comparison of the blood alcohol level of the secondary driver to the predetermined alcohol level.

FIG. 3 depicts a method 100 for monitoring alcohol based on driver status and for controlling vehicle operations in accordance to one embodiment of the present invention. It is recognized that the operations disclosed in connection 100 may be executed in any suitable arrangement and that the operations are not intended to be executed solely in the manner shown.

In operation 102, the device 22 receives the signal IGN_SW_STS to determine whether the vehicle is in the RUN or START position.

In operation 106, the device 22 determines whether the driver of the vehicle is the primary driver or the secondary driver based on the information contained on the signal DRIVER_STATUS_1. It is contemplated that the device 22 may further determine whether the alcohol monitor is enabled by the primary driver so that such a feature goes into effect when the secondary driver is detected to be the driver of the vehicle. If the driver is detected to be the primary driver, then the method 100 moves to operation 108. If the driver is detected to be the secondary driver and the alcohol monitor feature is enabled, then the method 100 moves to operation 110.

In operation 108, the device 22 resumes normal operation in which the primary driver may not be required to provide blood alcohol content.

In operation 110, the device 22 determines whether the time of day falls within the established alcohol monitor window. For example, the device 22 may determine the time of day in which the driver is attempting to drive the vehicle based on the signals IGN_SW_STS and TIME_DATA. The device 22 may record the time data on the signal TIME_DATA provided by the APIM 50 the moment in which the signal IGN_SW_STS is in the RUN or START position. If the time of day does not fall within the established alcohol monitor window, then the method 100 moves to operation 108. If the time of day falls within the established alcohol monitor window, then the method 100 moves to operation 112.

In operation 112, the device 22 alerts the secondary driver to use the AMD 40 so that a blood alcohol measurement is taken.

In operation 114, the device 22 also starts a timer to indicate whether the secondary driver has provided a measurement of his/her blood alcohol content within the predetermined amount of time. It is recognized that the timer may be adjustable by the primary driver via the user interfaces (24, 26, and/or 27) to enable the secondary driver a reasonable amount of time to use the AMD 40.

In operation 116, the device 22 transmits the signal DISABLE to control the audio controller to cease transmitting audio and/or video signals for entertainment purposes. This operation is performed to encourage the secondary driver to use the AMD 40 within the predetermined amount of time.

In operation 118, the device 22 transmits the signal TRANSMIT to the PCM 42 so that the PCM 42 and the engine coact 44 with one another to either (i) limit the vehicle speed or (ii) prevent the vehicle from attaining a speed.

In operation 120, the device 22 determines whether the signal MEASURE_1 (e.g., blood-alcohol content of secondary driver) has been received within the predetermined amount of time (e.g., before the timer has expired). If the device 22 determines that the signal MEARSURE_1 has been received before the timer expires, then the method 100 moves to operation 122. If the device 22 determines that the signal MEARSURE_1 has not been received after the timer has expired, then the method 100 moves to operation 124. The case in which the device 22 does not receive the signal MEASURE_1 may be indicative of the secondary driver not willing to provide an alcohol measurement or the condition in which the secondary driver may have removed the AMD 40 from the vehicle.

In operation 122, the device 22 determines whether the blood alcohol content of the secondary driver is above the predetermined alcohol level. If the blood alcohol content is above the predetermined alcohol level, then the method 100 moves to operation 124. If the blood alcohol content is below the predetermined alcohol level, then the method 100 moves to operation 108 and resumes normal operation.

In operation 124, the device 22 records an over alcohol blood content condition for the secondary driver or records that the secondary driver has failed to cooperate in providing an alcohol measurement. The device 22 may provide a report for display to the primary driver.

In operation 126, the device 22 transmits the signal DISABLE to control the audio controller 46 to cease transmitting audio and/or video signals for entertainment purposes.

In operation 128, the device 22 visually and/or audibly warns the driver regarding the dangers of driving while under the influence of alcohol.

In operation 130, the device 22 transmits the signal NOTIFY to the APIM 50 to notify the primary driver that the secondary driver has a blood alcohol content that is over the predetermined alcohol content or to notify the primary driver that the secondary driver has failed to provide an alcohol measurement. The APIM 50 may use the OCD 54 that is operably coupled therewith to transmit a text message to the primary driver's OCD. In the event the secondary driver's OCD 54 is not coupled to the APIM 50, the transmitting device 48 may transmit a text message to the primary driver's communication device.

In operation 132, the device 22 transmits the signal LIMIT to the PCM 42. In one example, the PCM 42 and the engine 44 may limit the speed/acceleration of the vehicle to a speed (e.g., 15 mph or other suitable speed). In another example, the PCM 42 and the engine 44 may simply prevent the vehicle from accelerating (or moving) even if the secondary driver is attempting to accelerate the vehicle.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An apparatus for performing an alcohol monitor in a vehicle based on a driver being one of a primary driver and a secondary driver, the apparatus comprising:
    an electronic device positioned within the vehicle and being configured to:
        receive a driver status signal indicative of the driver being the secondary driver;
        store a time window interval as established by the primary driver, the time window interval corresponding to a fixed period of time in which the secondary driver is required to provide the alcohol content measurement with the AMD;
        receive an alcohol content measurement within the time window interval and prior to driving the vehicle from an alcohol monitoring device (AMD) indicative of blood alcohol content for the secondary driver;
        compare the alcohol content measurement to a predetermined alcohol content for the secondary driver; and
        transmit a first signal to an entertainment device to disable an operation of transmitting at least one of an audio signal and a video signal for the secondary driver prior to receiving the alcohol measurement.

2. The apparatus of claim 1 wherein the electronic device is further configured to transmit a limit signal in response to receiving the alcohol content measurement such that the vehicle can be driven, the limit signal corresponding to a command to control the vehicle to operate at a non-zero safe speed limit that is less than a predetermined vehicle speed if the alcohol content measurement is greater than the predetermined alcohol content.

3. The apparatus of claim 1 wherein the electronic device is further configured to receive an ignition switch status signal indicative of the secondary driver attempting to drive the vehicle.

4. The apparatus of claim 3 wherein the electronic device is further configured to generate a first time value corresponding to the time of day in which the ignition switch status signal is received and to determine whether the first time value is within the time window interval.

5. The apparatus of claim 4 wherein the electronic device is further configured to alert the secondary driver to provide the alcohol content measurement if the first time value is within the time window interval.

6. The apparatus of claim 1 wherein the electronic device is further configured to wirelessly transmit a notification from the vehicle to a first device positioned outside of the vehicle to notify the primary driver in the event the alcohol content measurement exceeds the predetermined alcohol content.

7. The apparatus of claim 1 wherein the electronic device is further configured to transmit a second signal for providing a wireless notification to the primary driver in the event the secondary driver fails to provide the alcohol content measurement within a predetermined time frame.

8. The apparatus of claim 1 wherein the electronic device is further configured to control the entertainment device to disable providing the audio signal for the secondary driver in the event the secondary driver fails to provide the alcohol content measurement within a predetermined time frame.

9. An apparatus for performing an alcohol monitor in a vehicle based on a driver being one of a primary driver and a secondary driver, the apparatus comprising:
    an interface device configured to:
        receive a driver status signal indicative of the driver being the secondary driver;

notify the secondary driver to provide an alcohol content measurement;

transmit a first signal to an entertainment device to disable an operation of providing one of an audio signal and a video signal for the secondary driver prior to providing the alcohol content measurement; and compare the alcohol content measurement to a predetermined alcohol content.

10. The apparatus of claim 9 wherein the interface device is further configured to store a time window interval that corresponds to a fixed period of time in which the secondary driver provides the alcohol content measurement.

11. The apparatus of claim 10 wherein the interface device is further configured to receive the alcohol content measurement within the time window interval and prior to driving the vehicle.

12. The apparatus of claim 9 wherein the interface device is further configured to transmit the first signal in the event the secondary driver fails to provide the alcohol content measurement within a predetermined time frame.

13. The apparatus of claim 9 wherein the interface device is further configured to transmit a second signal for providing a wireless notification to the primary driver in the event the secondary driver fails to provide the alcohol content measurement within a predetermined time frame.

14. The apparatus of claim 9 wherein the interface device is further configured to control the entertainment device to disable providing the one of the audio signal and the video signal for the secondary driver in the event the secondary driver fails to provide the alcohol content measurement within a predetermined time frame.

15. The apparatus of claim 9 wherein the interface device is further configured to transmit a limit signal corresponding to a command to control the vehicle to operate at a non-zero safe speed value that is less than a predetermined vehicle speed if the alcohol content measurement is greater than the predetermined amount.

16. An apparatus comprising:
a vehicle interface device configured to:
receive a driver status signal indicative of a driver being one of a primary driver and a secondary driver;
notify the secondary driver to provide an alcohol content measurement;
transmit a first signal to an entertainment device to disable providing an audio signal for the secondary driver prior to providing the alcohol content measurement; and
compare the alcohol content measurement to a predetermined alcohol content.

17. The apparatus of claim 16 wherein the vehicle interface device is further configured to transmit a second signal for providing a wireless notification to the primary driver in the event the secondary driver fails to provide the alcohol content measurement within a predetermined time frame.

18. The apparatus of claim 16 wherein the vehicle interface device is further configured to control the entertainment device to disable providing the audio signal for the secondary driver in the event the secondary driver fails to provide the alcohol content measurement within a predetermined time frame.

19. The apparatus of claim 16 wherein the vehicle interface device is further configured to transmit a limit signal corresponding to a command to control a vehicle to operate at a non-zero safe speed value that is less than a predetermined vehicle speed if the alcohol content measurement is greater than the predetermined amount.

\* \* \* \* \*